United States Patent
Citrin et al.

(10) Patent No.: US 9,390,472 B2
(45) Date of Patent: Jul. 12, 2016

(54) SYSTEMS AND METHODS FOR GENERATING AN INTERACTIVE MOSAIC COMPRISING USER VISUAL CONTENT DATA ON A PORTABLE TERMINAL AND AN IMAGE SHARING PLATFORM

(71) Applicant: Fractograf, LLC, Fulton, MD (US)

(72) Inventors: Warren Ira Citrin, Laurel, MD (US); Stephen Michael Jones, Olney, MD (US); Ryan Miles Chacon, Laytonsville, MD (US); Robert Valentine Lee, Columbia, MD (US); Micardo Johns, Laurel, MD (US)

(73) Assignee: Fractograf, LLC, Fulton, MD (US)

( * ) Notice: Subject to any disclaimer, the term of this patent is extended or adjusted under 35 U.S.C. 154(b) by 17 days.

(21) Appl. No.: 14/274,024

(22) Filed: May 9, 2014

(65) Prior Publication Data

US 2015/0254807 A1    Sep. 10, 2015

Related U.S. Application Data

(60) Provisional application No. 61/949,540, filed on Mar. 7, 2014.

(51) Int. Cl.
    *G06K 9/36*  (2006.01)
    *H04N 7/00*  (2011.01)
    (Continued)

(52) U.S. Cl.
    CPC ............... *G06T 3/4038* (2013.01); *G06T 11/60* (2013.01); *H04N 1/00183* (2013.01);
    (Continued)

(58) Field of Classification Search
    CPC .................. G06T 3/4038; G06T 2207/20212;
    G06T 2207/20221; G06T 11/60; H04N 1/00183; H04N 1/00196; H04N 1/00198; H04N 1/00411; H04N 1/00453; H04N 1/00456; H04N 1/00461; H04N 1/00464; H04N 1/469; H04N 1/00506; H04N 1/00514; H04N 2201/3256; H04N 2201/3273; H04N 2201/325
    USPC .............................................. 382/284; 348/36
    See application file for complete search history.

(56) References Cited

U.S. PATENT DOCUMENTS

| | | | |
|---|---|---|---|
| 8,159,550 B2 * | 4/2012 | Paine ................. | G06T 3/4038 348/222.1 |
| 2001/0050955 A1 * | 12/2001 | Zhang ................. | H04N 19/23 375/240.12 |

(Continued)

FOREIGN PATENT DOCUMENTS

EP          1061475 A2    12/2000

*Primary Examiner* — Kanjibhai Patel
(74) *Attorney, Agent, or Firm* — Kristin Mazany Nevins; Offit Kurman

(57) ABSTRACT

There is disclosed an image processing method for generating a mosaic of images. The method includes selecting a cover image from a plurality of images and dividing the cover image into a number of grid blocks. For each grid block, the average color (or other parameter) is calculated and each grid block is assigned a sub-content based on the color matching. Mosaic generation information is transmitted to a server, the mosaic generation information including a list of sub-content to be displayed in the mosaic, each sub-content including corresponding grid block location information. A server verifies whether each of the sub-content exists on the server and transmits sub-content not present on the server, to the server. The mosaic is displayed on a display of a portable terminal the sub-content using the mosaic generation information so that the cover image is reproduced to form of a mosaic of sub-content that represents the cover image and each sub-content includes additional information specific to each sub-content.

15 Claims, 15 Drawing Sheets

(51) Int. Cl.
*G06T 3/40* (2006.01)
*G06T 11/60* (2006.01)
*H04N 1/00* (2006.01)
*H04N 1/32* (2006.01)

(52) U.S. Cl.
CPC ...... *H04N 1/00196* (2013.01); *H04N 1/00198* (2013.01); *H04N 1/00411* (2013.01); *H04N 1/00453* (2013.01); *H04N 1/00456* (2013.01); *H04N 1/00461* (2013.01); *H04N 1/00464* (2013.01); *H04N 1/00469* (2013.01); *H04N 1/00506* (2013.01); *H04N 1/00514* (2013.01); *H04N 1/32106* (2013.01); *G06T 2207/20212* (2013.01); *H04N 2201/0084* (2013.01); *H04N 2201/325* (2013.01); *H04N 2201/3247* (2013.01); *H04N 2201/3249* (2013.01); *H04N 2201/3256* (2013.01)

(56) References Cited

U.S. PATENT DOCUMENTS

| | | | |
|---|---|---|---|
| 2007/0296824 A1 | 12/2007 | Paine | |
| 2012/0250986 A1* | 10/2012 | Masuko | H04N 1/3876 382/164 |
| 2014/0016147 A1* | 1/2014 | Hobbs | G06T 11/60 358/1.9 |
| 2014/0204125 A1* | 7/2014 | Smith | G06F 17/30244 345/641 |

* cited by examiner

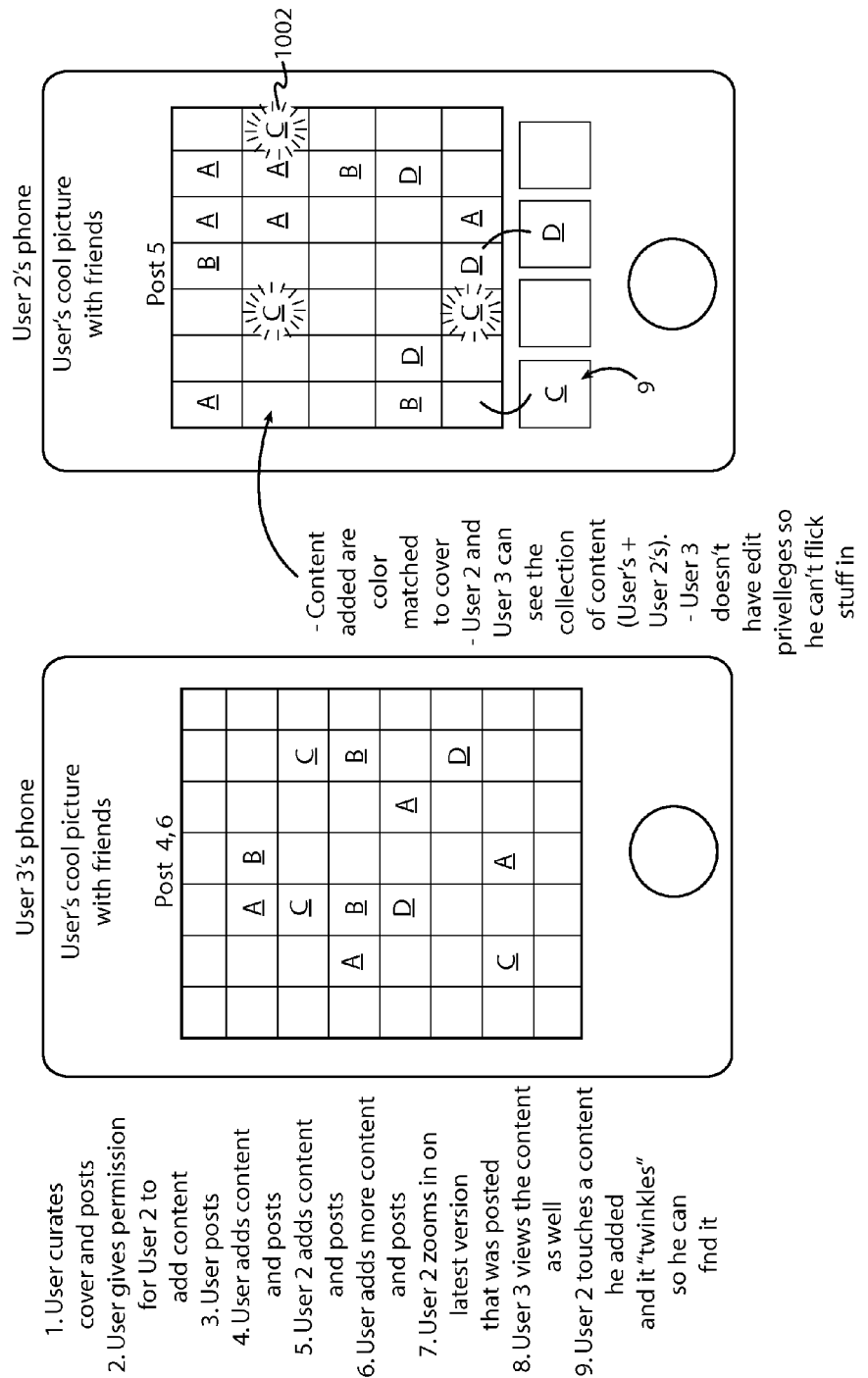

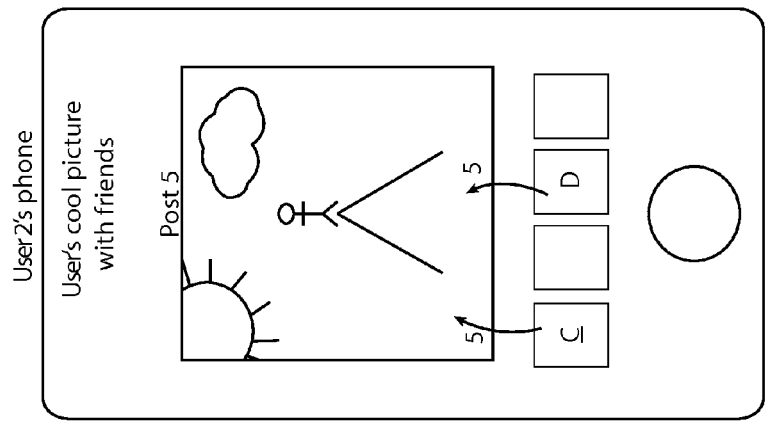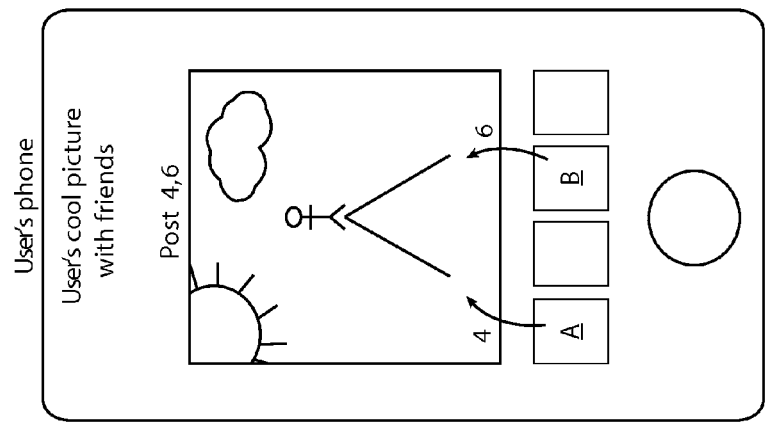
FIG. 10B
Collaborating and Sharing Platform

SYSTEMS AND METHODS FOR GENERATING AN INTERACTIVE MOSAIC COMPRISING USER VISUAL CONTENT DATA ON A PORTABLE TERMINAL AND AN IMAGE SHARING PLATFORM

CROSS REFERENCE TO RELATED APPLICATIONS

This Application claims the benefit of U.S. Provisional Patent Appl. No. 61/949,540 filed on Mar. 7, 2014, the contents of which are hereby incorporated by reference in their entirety.

FIELD OF INVENTION

The present invention, and various embodiments thereof, relates to image creation, production, manipulation, editing and sharing, and more particularly, but not exclusively, to systems and methods of selectively adjusting visual content data on a portable terminal. Also provided is a plurality of visual content data editing functions and methods thereof.

BACKGROUND

The market for purchasing portable terminals, such as a feature phone, smart phone, personal digital assistant, tablet computer, etc., has rapidly grown because of various breakthrough designs and applications that have stimulated consumer demand. In particular, unlike an existing feature phone using only given functions, a smart phone may download and install various applications for taking a photograph or photographing a moving image, playback of audio and video, on-line games, watching broadcasting, or accessing social media network services from an on-line market.

Meanwhile, more recent portable terminals typically include a touch screen and provide a method for managing and generating a user's content (captured by the portable terminal or downloaded from another storage source) through the touch screen. However, as cameras within portable terminals continue to increase in power creating data of ever increasing size, the challenge becomes how to easily share large amounts of data quickly and efficiently. For example, transferring data files across mobile networks and other networks is both costly and slow.

BRIEF SUMMARY

The present invention provides a system and method for transferring and storing images and content and arranging the content in the form of an interactive mosaic on a portable terminal, and sharing the interactive mosaic images amongst a network of users.

In accordance with a first aspect there is provided a method for generating a mosaic of images, the method comprising the steps of: selecting a cover image from a plurality of images; dividing the cover image into a predetermined number of grid blocks; calculating an average matching value of each of the grid blocks and storing the average matching value and the corresponding grid block coordinate information that indicates the relative positions of the grid blocks relative to each other within the cover image; selecting for each grid block, sub-content from a library of sub-content based on an accepted correspondence between the average matching value of the grid block and an average matching value sub-content, and assigning the sub-content to the grid block; verifying with a server to determine whether each of the sub-content exists on the server and transmitting sub-content not present on the server, to the server; transmitting mosaic generation information to the server, the mosaic generation information including a list of sub-content to be displayed in the mosaic, each sub-content including corresponding grid block location information, wherein the information comprises metadata, average matching values, geo-tags, image recognition tags, user identifying information, or other identifying information; displaying on a display of a portable terminal the sub-content using the mosaic generation information so that the cover image is reproduced to form of a mosaic of sub-content that represents the cover image; wherein each sub-content includes additional information specific to each sub-content.

The benefit of the method is that a large number of images are displayed on a small screen, with the added benefit of the arrangement presenting an overall appearance of a still image until the image is expanded in order to view the large number of individual images arranged within the still image.

In accordance with another aspect there is provided a method for sharing information added to at least one mosaic of sub-content on a first portable terminal, the method comprising the steps of: synchronizing and reproducing at least one mosaic of sub-content by a first portable terminal in real time with a second portable terminal by transmitting the mosaic of sub-content by a first portable terminal to a server, the server transmitting the mosaic of sub-content to the second portable terminal; receiving a change to the at least one mosaic of sub-content from the first portable terminal and transmitting the sub-content changes to the server; and transmitting by the server the change to the at least one mosaic of sub-content to the second portable terminal for display by the second portable terminal.

In accordance with another aspect there is provided a method for linking content between multiple mosaics on portable terminals, the method comprising the steps of: accessing a first mosaic of sub-content from a server and downloading the first mosaic of sub-content onto a first portable terminal for displaying on a display of the first portable terminal; identifying a link between the first mosaic of sub-content and a second mosaic of sub-content stored on the server using predetermined identification criteria, wherein the link is a visual indicator that is evident to a user and signals an entry point into another mosaic of sub-content when the link is selected by the user; accessing the second mosaic of sub-content from a server and generating and transmitting a sub-content representing the second mosaic of sub-content onto a first portable terminal for displaying on a display of the first portable terminal; embedding within the first mosaic of sub-content, the second mosaic sub-content representing the second mosaic of sub-content so that the first mosaic of sub-content and a second mosaic of sub-content are linked.

In accordance with another aspect there is provided a portable device comprising: a display; a communication unit that receives first mosaic generation information to generate a first mosaic of sub-content, wherein each sub-content includes additional information linked to the sub-content; and a controller that controls the display to display the first mosaic of sub-content on the display, the controller receives an input modifying the first mosaic of sub-content displayed on the display, and the controller generates second mosaic generation information to generate a second mosaic of sub-content based on the input, and controls the communication unit to transmit the second mosaic generation information to a server to store the second mosaic generation information.

In accordance with another aspect there is provided a non-transitory computer-readable medium having recorded thereon a program that causes a portable device to execute a method for generating a mosaic of images, the method comprising:

selecting a cover image from a plurality of images; dividing the cover image into a predetermined number of grid blocks; calculating an average match value of each of the grid blocks and storing the average match value and the corresponding grid block coordinate information that indicates the relative positions of the gird blocks relative to each other within the cover image; selecting, for each grid block, a sub-content from a user defined library of sub-content based on an accepted correspondence between the average match value of the grid block and an average match value of the sub-content, and assigning the sub-content to the grid block; displaying on a display of the portable terminal the sub-content using the grid block location information so that the cover image is reproduced using a predetermined number of sub-content to form of a mosaic of sub-content that represents the cover image; transmitting the mosaic of sub-content and the selected sub-content with corresponding grid block location information to a server; wherein each sub-content includes additional information specific to each sub-content.

In a further aspect, there is disclosed a portable device comprising: a display; a communication unit that receives a first mosaic of sub-content, wherein each sub-content includes additional information linked to the sub-content; and a controller that controls the display to display the first mosaic of sub-content on the display, receives an input modifying the first mosaic of sub-content displayed on the display, generates a second mosaic of sub-content based on the input, generates second mosaic information based on the second mosaic of sub-content, and controls the communication unit to transmit the second mosaic of sub-content, the request comprising the second mosaic information.

In a further aspect, there is disclosed a non-transitory computer-readable medium having recorded thereon a program that causes a portable device to execute a method for generating a mosaic of images, the method comprising: selecting a cover image from a plurality of images; dividing the cover image into a predetermined number of grid blocks; calculating an average match value of each of the grid blocks and storing the average match value and the corresponding grid block coordinate information that indicates the relative positions of the grid blocks relative to each other within the cover image; selecting, for each grid block, sub-content from a library of sub-content based on an accepted correspondence between the average match value of the grid block and an average match value of the sub-content, and assigning the sub-content to the grid block; verifying with a server to determine whether each sub-content exists on the server and transmitting sub-content not present on the server, to the server; transmitting mosaic generation information to the server, the mosaic generation information including a list of sub-content to be displayed in the mosaic, each sub-content including corresponding grid block location information such as average match values; displaying on a display of a portable terminal the sub-content using the mosaic generation information so that the cover image is reproduced to form of a mosaic of sub-content that represents the cover image; wherein each sub-content includes additional information specific to each sub-content.

Also provided is a visual data sharing platform, which allows a user to share an image or other content data with others amongst and within a network of other users.

The present invention allows sharing, visualizing, and collaborating on visual content. One embodiment of the invention comprises a social network configured for the creation, sharing, and viewing of one or more user-generated visual content data comprising an interactive mosaic.

BRIEF DESCRIPTION OF THE DRAWINGS

Embodiments of the invention are further described hereinafter with reference to the accompanying drawings, in which:

FIGS. 10A and 10B show additional features of the collaborating and sharing platform according to one embodiment of the invention.

DETAILED DESCRIPTION OF THE INVENTION

Definitions

Figure 1:
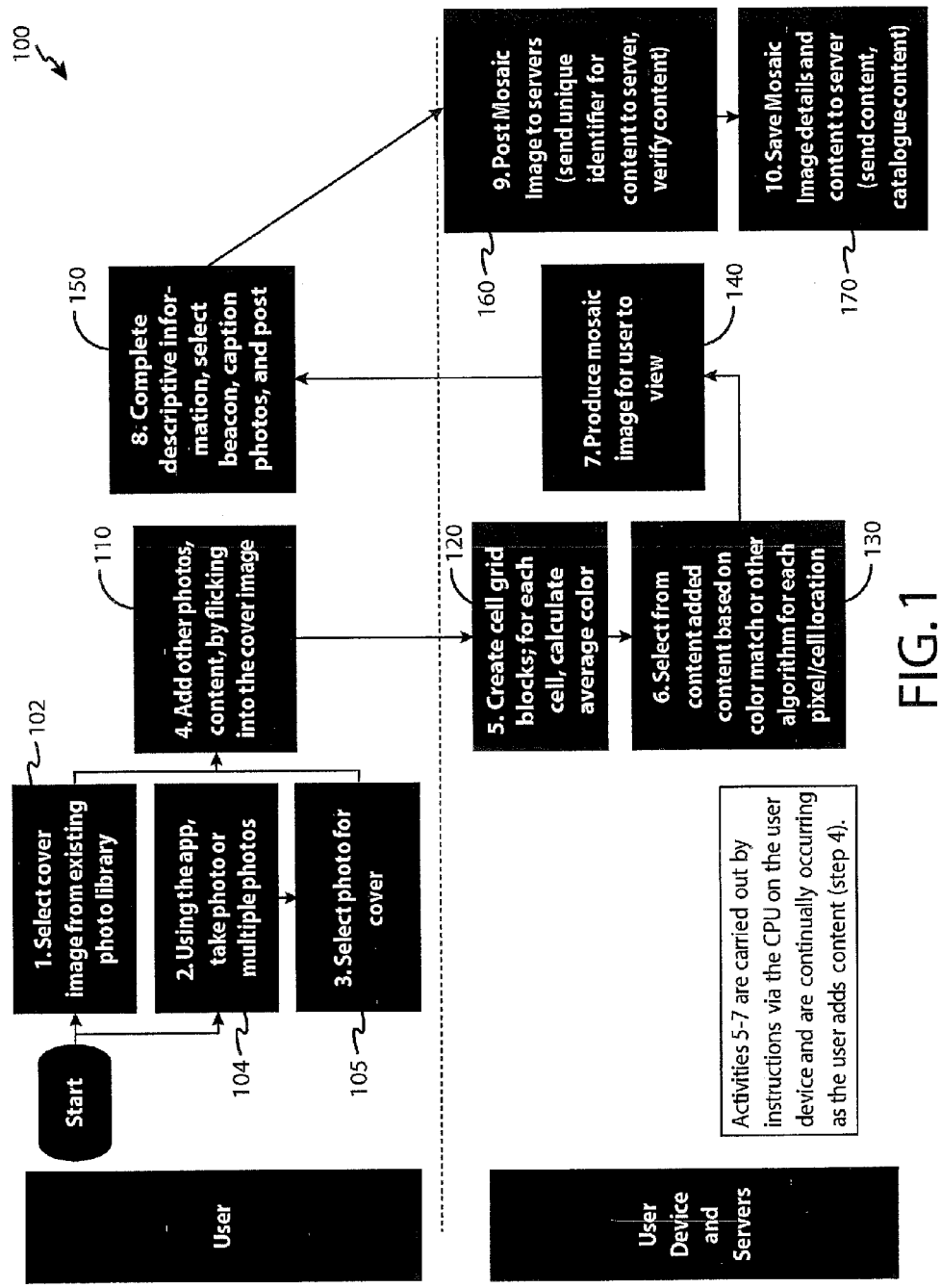
FIG. 1 is a flow chart showing an image processing method.

The following terms are used in this disclosure to describe different aspects of the invention and the environment in which the invention operates. These terms are used for explanation purposes only and are not intended to limit the scope for any aspect of the invention.

Content and sub-content as used herein refers to one or more of the following: a digital image, photo, video, video stream, animation, song, music clip, mp3 file, link to other source and/or content, link to social network feed (such as Facebook, Twitter). Sub-content also refers to a plurality of content arranged to create a mosaic image.

Cover image refers to a first image selected as a template to be used as the basis of the mosaic image.

Mosaic image refers to an interactive image produced by arranging and/or linking together various content and sub-content in a manner described in more detail herein, wherein in the composite image produced corresponds to the cover image.

Portable terminal as used herein refers to various devices such as a smartphone (iPhone, Android), a tablet, a portable computer, or other similar user device. Portable terminals are configured for wireless communications with a server, such as a cloud server, but can also communicate via hard-wire communication.

SHA refers to one of several cryptographic hash functions, most often used to verify that a file has been unaltered. SHA is short for Secure Hash Algorithm.

Overview of Various Embodiments of the Invention:

In one embodiment, various visual content are combined to form a collection (photo, video, with or without sound, or other content, and including combinations thereof); the result is an interactive mosaic built from user-selected content, from predefined content, or a combination of both. This organization has significant advantages over other organization tools because of the ability for a user to see many images at once and easily scan to find items of interest.

In one particular embodiment, individual content used in the present invention is compressed to be 512×512 pixels; however, other dimensions are contemplated.

In one embodiment, to produce a mosaic image from a cover image, a cover image is first selected and then the cover image is sectioned, or partitioned into an x,y grid. In one embodiment, the standard grid is 80×60 (W×H), however other dimensions are contemplated. (For example: If W≥H, 80×(80*h/w); if W≤H, (80*w/h)×80. In this example, k=80, however, other values are envisioned.) Dimensions and grid values are, in part, dependent on the aspect ratio of the cover image.

In one embodiment, for each grid section, a value is calculated, which corresponds to one or more characteristics of the particular section, such as color, lightness, darkness, subject matter. A value map of the grid is created and information is stored. Each value is used to match against the value of the selected content for the mosaic.

Each of the grid section values is then matched amongst determined values of a plurality of sub-content that a user has identified, in order to make up the mosaic image. For example, a matching algorithm compares one or more content values and determines a good match within the mosaic arrangement on the value map; if more than one content can both serve as a best match, the content used with the less frequency will be placed into the mosaic image to ensure more variety of content in the resulting image.

In one embodiment, the resulting interactive mosaic is comprised of all the sub-content selected by the user. In another embodiment, the mosaic image can also include sub-content selected independently or randomly, or by intention placement, by way of the matching algorithm selecting system-generated content from a library of known content. In yet another embodiment, sub-content selection and sub-content placement can be based on other criteria such as user targeting, product placement, etc.

To sub-content, the user may add captions, links, and other details into each mosaic image created. The system is also configured such that a mosaic image may be posted via a server to a social network platform so that it may be viewed by others.

In the case where the image is not a still image, but moving, the mosaic image is generated when the user stops the video (and the image becomes still). The still image then serves as the cover image or as sub-content. As the image becomes still, this case is reduced to the still image case described previously.

In another embodiment, the system is configured with collaborative editing capabilities. For example, the system is configured such that a second user can be granted permission to edit an interactive mosaic created by a first user. To edit, the mosaic image is retrieved from the server. The editing approach resembles the mosaic image generation approach with a pre-existing mosaic image (cover image, sub-content, and details about the image and/or content) to which new content is added by the second user. In yet another embodiment, the system is configured with a share feature whereby, the feature permits a second user to edit a first user's mosaic image when a first user shares the image with the second user. The share function permits content to be shared between the first user and the second user without the need for the second user to open the mosaic image for editing. In another embodiment, editing methods are envisioned including methods which do not require a user to open a mosaic image to add or remove content from the mosaic image.

The system is configured with additional features such as visual indicators for linked content, such as when a mosaic is imbedded within a mosaic. For example, a visual indicator, referred to herein as a beacon, may appear as a faint image emanating from the sub-content to which an additional mosaic image is linked. Additionally, other effects, such as a pulsed light or flash, or color indicator can be employed to identify a particular user's embedded content.

While mosaics are viewed and created on a portable terminal such as a tablet or smartphone, alternative viewing and creating methods are anticipated, such as a web browser.

Calculating Average Values for Matching of Content

In one embodiment, the interactive mosaic is created by matching sub-content of a certain value with a complimentary value of one of the cover image grid coordinates. Match values can be based on various identifying characteristics associated with the sub-content, such as: color, intensity of color, lightness, darkness, image topic, image recognition criteria, or other criteria such as geographic data, or information associated with sub-content via tagging.

In one embodiment, for each sub-content selected, a value is calculated. Likewise, for the cover image grid array, for each grid block, a value is calculated. In turn, a "value map" is created amongst the grid array. For example, in one embodiment, values correspond to a numbering system, and each grid block in the grid array will be assigned a number that represents a match value. In turn, the sub-content with the complimentary or most closely-approximated value will be placed in the appropriate location on the value map. The system is configured to store the values, such as in a list, until the mosaic is created by arranging the sub-content in the proper alignment with the value map.

Matching of Content Based on Values of Regions within an Image

In another embodiment, the system is configured to define a region of an image for value calculation, in which the resulting value of the region will be used to match sub-content. In one embodiment, the region is defined by a plurality of grid blocks, or sub-regions within grid blocks. In one embodiment, regions within the cover image can be automatically defined using image recognition technology. For example, the system can be configured to recognize one or more images from a pre-defined library of images and/or content, for example: images of objects, such as a car, tree, boat, football, or any other known and previously identified images. The grid blocks within the region will be assigned a value that facilitates matching to sub-content, for example sub-content of the particular category, of the recognized image. The result is that sub-content included in the mosaic image is evaluated and tagged based on what images comprise them and then placed within the cover image according to the tags. In other words, the system is configured to recognize content of sub-content (for example, an image of a cat) and place it with a region within the corresponding grid blocks of a cover image (example, regions in the cover that contain the image of a cat).

In another embodiment, the system is configured to allow a user to select a number of regions within the cover image. The grid block regions within the user-identified regions will be tagged with a specific value that facilitates matching to other user-defined sub-content. Once the values are set for the particular grid locations in the region, user sub-content matching occurs based on the values in the grid locations and the values assigned to the user sub-content. In one particular example, suppose within a cover image the user were to select a region around an image of a cat and tag the region as such. The user—or as previously described, the system—could then identify sub-content to be matched to the defined region because it has been tagged as relating to cats. The matching algorithm in this case will calculate values based on sub-content information related to the tagged image of a cat. The placement on the value map is based on the subject of the user-defined region and tags on the selected sub-content, in other words, cat-related sub-content values will be assigned the position within the cover value map corresponding to cat-related values.

Linking Content:

In one embodiment, the system is configured for linking content in mosaic images to other content, including other mosaic images. In another embodiment, content can be one or more of an image, an audio file, a video clip or stream, or a combination thereof. Additionally, users can add content into other mosaic images through collaborative editing features. For example, suppose a user creates Mosaic Image A and adds Mosaic Image B by selecting Mosaic Image B as sub-content. Subsequently, a viewer of Mosaic Image A can visually navigate around the mosaic image to find the cover image of Mosaic Image B. Through this cover image, the viewer may enter Mosaic Image B. Additionally, Mosaic Image B may contain a Mosaic Image C, which the viewer may also enter. This linking method is novel and has the benefit that the user may navigate to other content without having to leave their current content to look for a menu or feed. Existing content viewing and sharing platforms deliver content in a manner than can lead to the user needing to 'go back' or go to a menu as they reach the end of a collection of content and want to continue viewing.

Collaborating on Content:

In one embodiment, the system is configured for collaborating on content. Mosaic images are collections of content. For example, in one particular embodiment, collections comprise up to 1024 individual sub-content items. The system makes it possible for users to place content in mosaic images they do not own so long as they are given permission by the owner of the mosaic. This collaboration is novel because of the opportunity users are given to co-create mosaic images and shape their content. A user's image becomes not just part of a collection of photos, but a part of a mosaic artwork; the images are interspersed and grouped to create a visually appealing mosaic arrangement. Current content sharing platforms offer the opportunity for users to create 'shared albums' or 'folders.' These platforms take users photos and place them together a list and show the photos one-by-one, such as thumbnails of images. This results in the content being together, but not together in a way that is unique or novel.

Updating Content:

In one embodiment, the program is configured for global edits: for synchronization and propagation of edits across the network of connected users. For example, when a user modifies content attributes, such as a title to sub-content or to a mosaic image, the content is updated to the newly assigned attributes and then updated across the platform. In one embodiment, global edits are carried out by uploading user edits from the portable terminal where the change initiated, to the server after the user takes a specific action to upload those updates. In one form, they system is configured so that the server records which terminals are viewing which content and upon receiving an update, pushes that update to terminals viewing content that has been modified. In another case, the system is configured so that all terminals make requests to a server to check whether updates to the mosaic image currently displayed are available and if so, sends a request to download these updates. Terminals, upon receiving an update, modify what they display to display the modified mosaic image and modified sub-content. The result is that updates will occur for all users who have the modified content in their mosaic image data.

Exemplary Process for Creating a Mosaic Image

The present invention operates within a computer network environment comprised of servers, portable terminals, such as smartphones, and their operating systems, a website for sharing mosaics amongst a network of users, a software program of instructions for carrying out the method described herein, and access to the Internet to connect the various components. This network environment is shown in FIG. 10.

In one embodiment, the invention is carried out by a mobile application configured to carry out the following steps: identify a cover photo, calculate a value map of the cover photo, identify one or more sub-content, for each sub-content calculate a value, match each sub-content value with a corresponding value on the cover photo value map, verify with a server using SHA to determine if the sub-content already exist on the server, send sub-content to the server if not already deposited, send a list of content that make up the mosaic image to the server based on best match of values, save other details about mosaic image including title, description, permissions, linking identifier, etc.

Once the user has identified a cover image and indicated which sub-content, including sub-content comprised of mosaic images, it will contain, the following steps occur: SHAs for each image are calculated using the original image's bytes and the user's id, which allows the same image to be uploaded and owned by different users, SHAs are sent to the server, in turn the server will respond Image Ids for all SHAs that it already has stored, which prevents the image from being uploaded multiple times by the same user, all images that the server does not know about are then bulk uploaded to the server, the server responds with new Ids for each, the mosaic is posted to the server, the server will then respond with a new Id, all sub-content Ids are then put into a command message and uploaded to the server, sub-content can then be assigned various values, such as content type, id, color, and cover image reference, image source (such as User id).

Image Modification

In one embodiment, the program is configured for image modification. In one example, when the user ads and removes sub-content from a mosaic image, the client application creates a command list of additions and removals. When a post is triggered by the user, any new images are uploaded as indicated in the mosaic creation process, following which the command list is then sent to the server. This command list is applied against the current sub-content list stored in the server. This will merge multiple users commands' into the current mosaic. In one embodiment, sub-content will be removed when a number of stored sub-content reaches a threshold number, for example, 1000, which in turn provides each mosaic with 1000 user sub-content items. This number is used for illustrative purposes and could be essentially any value programmed. The server will then respond with the mosaic to be displayed by the device.

Mosaic Sub-Content Delivery

In one embodiment, when a mosaic image is requested from the server, it will assemble the metadata (name, description, owner, etc.) and the user supplied sub-content. The server will also create an optional extended sub-content list. This list will contain sub-content that will be included in the mosaic separate and distinct from user-initiated selection, such as for product placement or advertising. These might include advertisements, pre-defined content, information about the user, and advertiser preferences, or pre-selected advertisement content, and the mosaic image will be used to determine which extended sub-content are used. The program may calculate the sub-content positions for both the user-generated and server-generated sub-content using a content placement algorithm. In another embodiment, the program may also be configured with specific locations as pre-defined in which to place the server-generated sub-content.

Example of Sub-Content Layout

In one embodiment, the Cover image is divided into an W×H grid, such as a max value of W or H is 80, although this number is illustrative and other dimensions are envisioned.

In one embodiment, the program is configured with a random function, seeded with the same value each time, so multiple reruns will produce the same random sequence.

The order that each sub-content position (x, y) is visited is randomized to avoid dithering patterns and cause "forced content" additions to be scattered. About N positions will be preselected for use by the extended sub-content. The extended sub-content are placed in the first N positions.

For each grid position, a list of sub-content that have good value matches are calculated. A sub-content is selected based, in part, on the number of times it has been used already and if it's been used nearby the current (x,y) If the number of positions left is equal to the number of sub-content used less than four times, the algorithm will continue to fill the remaining positions with the sub-content used less than 4 times.

It is envisioned that additional embodiments will support explicit layout and region based layout that will allow given sub-content to exist only in given regions of the mosaic.

References to Figures

With reference to FIG. 1, there is shown a flow chart of an image processing method 100 according to an embodiment of the invention. The method comprises the following steps: A cover image is selected 102 from a plurality of images in an image library stored on a portable terminal such as a smart phone, tablet computer, personal computer or on an external server. Alternatively, a portable terminal captures 104 content such as an image using a camera or other capture device and the user then selects 105 the captured content.

The user then selects 110 a plurality of sub-content from a user defined library of sub-content. The library of sub-content is stored on the portable terminal. In an alternative embodiment, the library of sub-content may be stored on an external server, the library may by; alternatively, the user may capture sub-content using the portable terminal.

The cover image is divided 120 into a predetermined number of grid blocks or cells. The cover photo is divided into 4800 grid blocks.

An average color value of each of the grid blocks of the cover image is calculated 130 and the average color value and the corresponding grid block location information that indicates the relative positions of the grid blocks relative to each other within the cover image is stored on the portable terminal.

For each grid block, sub-content from a library of sub-content is selected 130 (or matched to each grid block). The sub-content is selected based on an accepted correspondence between the average color value of the grid block and an average color value of the sub-content, and once sub-content is selected, the sub-content is assigned to the grid block. Although the method is described in relation to a color matching algorithm, it should be appreciated that other parameters of the sub-content may be utilized to match sub-content to each grid block.

Each sub-content is matched to a grid block a predetermined number of times depending on the number of grid blocks and the number of sub-content selected by the user from the library 110.

The method includes a verification process, in communication with a server, to determine whether each of the sub-content of the mosaic exists on the server. If the sub-content already exists on the server, the sub-content is not transmitted to the server. However, if the verification process determines that the sub-content is not already stored on the server, the sub-content is transmitted to the server and stored on the server. The portable terminal uses secure hash algorithm (SHA) to verify if a sub-content is already on the server.

Once the mosaic has been generated 140, corresponding mosaic information is generated. The mosaic generation information includes information required to generate the mosaic including a list of sub-content to be displayed in the mosaic. Each sub-content includes the matching value information and any metadata details (such as title, caption, etc.).

The mosaic generation information is transmitted 170 to the server, the mosaic generation information being stored to the server.

The mosaic of sub-content is displayed on the display of the portable terminal. The sub-content is arranged on the display according to the mosaic generation information, so that the cover image is reproduced be a plurality of sub-content as specific locations to form of a mosaic of sub-content that represents the cover image.

Each sub-content includes additional information specific to each sub-content such as permissions of use by specific users, descriptive metadata including descriptive information about the sub-content such as time, date and location of capture of sub-content.

Figure 2A:
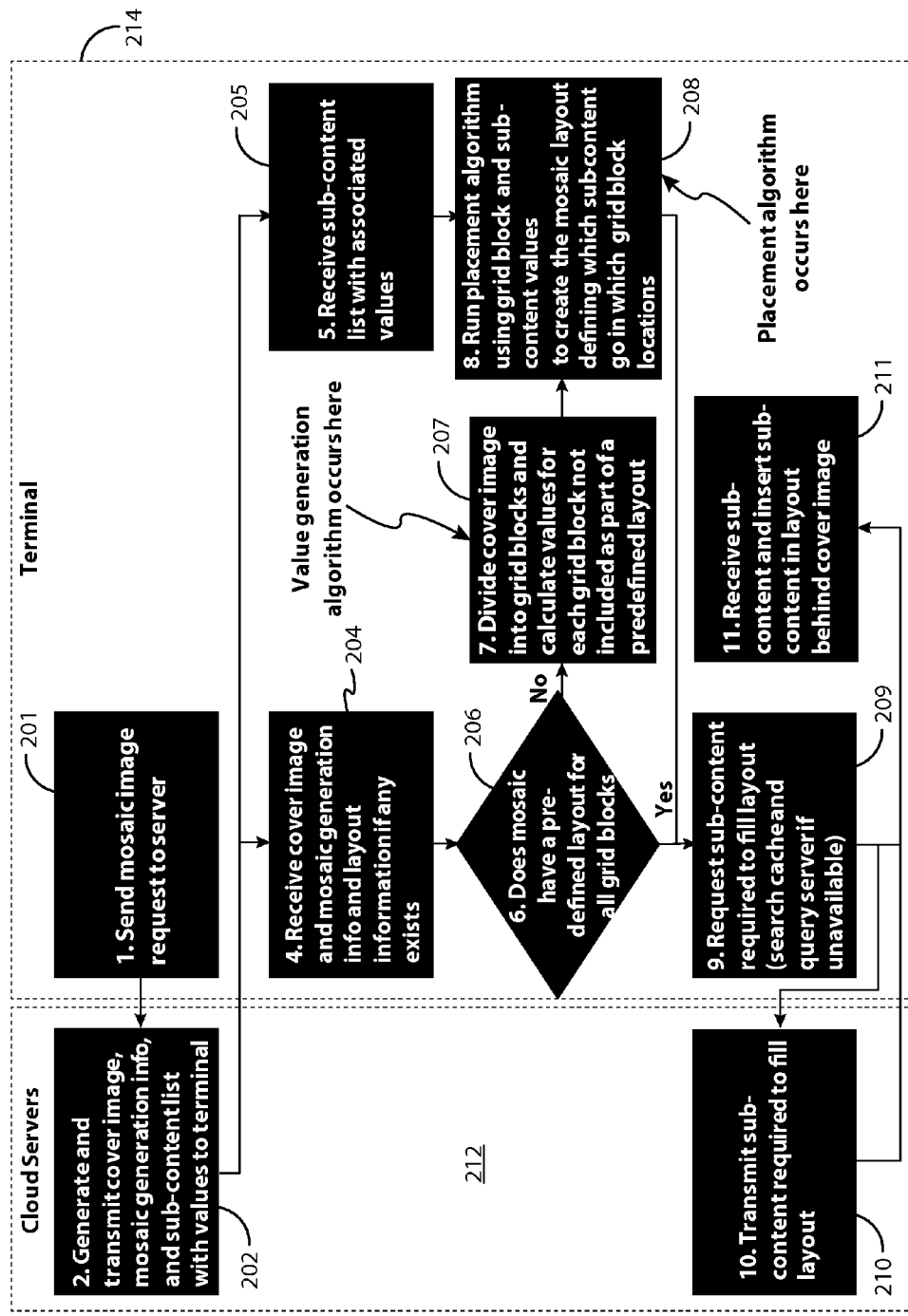
FIGS. 2A and 2B show an overview of a system of generating an interactive mosaic and an image value map according to one embodiment of the invention.

FIG. 2A shows a flowchart of a mosaic generation system according to one embodiment of the present invention. The system comprises a server 212, a portable terminal 214, on which are carried out the means for calculating a matching value and the means for generating a content layout, and a cover image.

In one embodiment, the means for calculating a matching value is by way of a value matching algorithm, whereby the matching algorithm generates and assigns values to regions of the cover image and mosaic sub-content, the value corresponding to one or more characteristics, such as color, lightness, darkness.

In another embodiment, the means for generating a content layout is carried out by way of a placement algorithm, whereby the values of the mosaic sub-content and cover image are arranged to produce a grid of indices that determine the placement of each sub-content, so that when the sub-content is placed in the produced layout (according to the value map), the resulting placement generates a mosaic that represents the cover photo.

In one embodiment, the value generating (matching) algorithm is carried out on the portable terminal over steps comprising: dividing the cover image into a grid array; extracting data, such as pixels, from a portion of each of the grid blocks in the grid array; calculating a value based on a specific pre-defined parameter, such as color, lightness, darkness, image recognition, tagged information, extracting data, such as pixels, from a portion of one or more sub-content and calculating a value as described above; and compiling an index of sub-content values.

In one embodiment, the placement algorithm is carried out on the portable terminal over steps comprising: collecting the assigned values to each block in the grid array; collecting the sub-content index values; and creating a grid of indices that determine the placement of each sub-content within the grid array, whereby the arrangement of sub-content, when arranged, will produce a mosaic representing the cover image.

FIG. 2A also shows the steps of the system and method for retrieving a mosaic image from a server, and generating that mosaic image on a portable terminal, according to one embodiment of the invention. At 201 a request for the mosaic image is sent to the server; at 202 the cover image, mosaic generation information, and sub-content list with values is generated and transmitted to the portable terminal; at 204 the portable terminal receives cover image information and mosaic generation information and layout information if any exists; at 205 the portable terminal receives sub-content list with associated values; at 206 the mosaic is queried for a pre-defined layout for all grid blocks, if the answer is no, at 207 the value generation (matching) algorithm occurs in order to calculate values for each grid block not included as part of a pre-defined layout; at 208 occurs the placement algorithm to match within an accepted correspondence grid block and sub-content values to create the mosaic layout (value map) defining which sub-content is the best match for the grid block locations. At step 209 (which occurs whether or not there is a pre-defined layout for the mosaic image), the portable terminal sends a request to the server requesting sub-content required to fill the layout of the mosaic, which can include searching a local cache first before a query of the server; at 210 the server, upon receiving the request, transmits sub-content required to fill the layout that is not available in the local cache back to the portable terminal; at 211 then sub-content received is then arranged into the mosaic based on the pre-defined rules or the mosaic layout created at step 208.

Figure 2B:
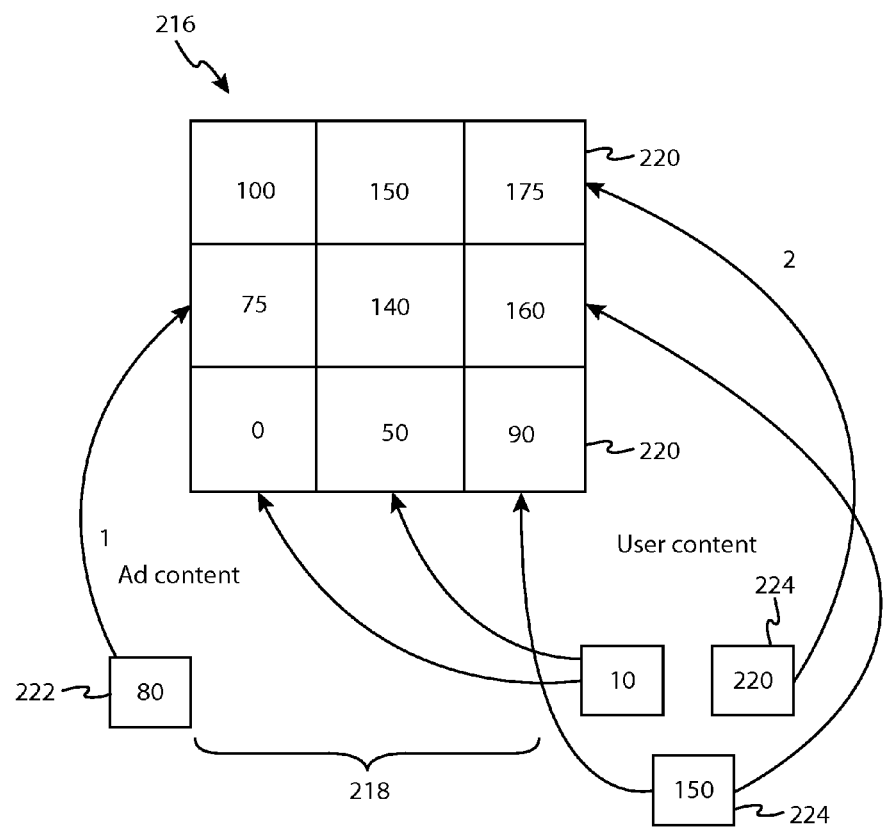

FIG. 2B shows an exemplary value matching grid of indices (value map), whereby the cover image 216 is shown as a value map 220, the indices on the map representing values to be matched with corresponding values associated with one or more sub-content 218. Sub-content 218 may be pre-defined 222 (i.e., selected by the system under various conditions) or user-defined content 224. In either event, the placement algorithm is configured for the placement of sub-content 218 in the proper position on the grid based on a value match between sub-content and the grid of indices, whereby the location of each sub-content is determined.

Figure 3:
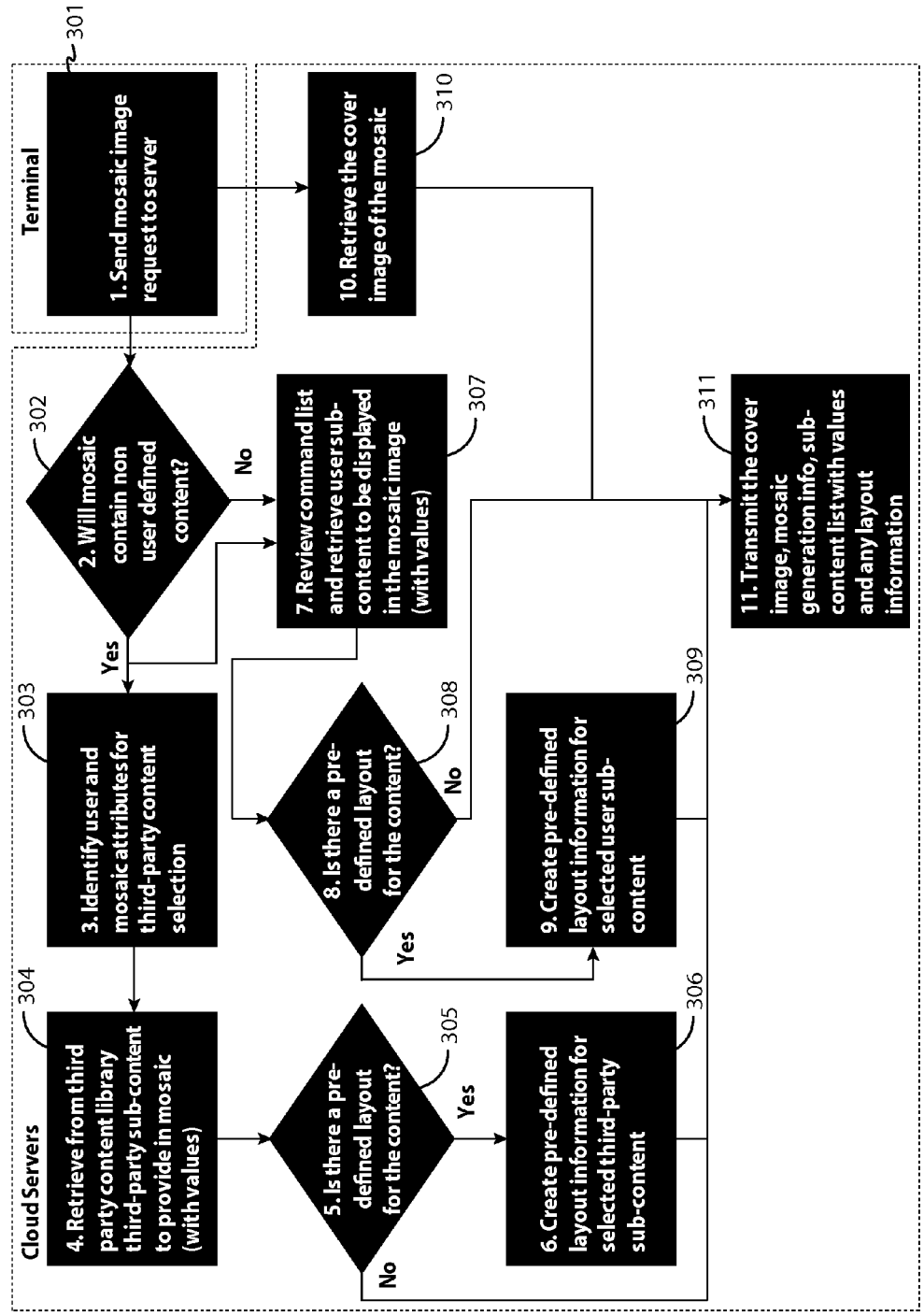
FIG. 3 is a flowchart showing an overview of the system of generating and retrieving a mosaic image from a server and generating that image on a portable terminal according to one embodiment of the invention.

FIG. 3 shows a system and method for generating mosaic sub-content, wherein one or more of the sub-content may be pre-defined and not user selected, according to one embodiment of the invention. At step 301 a mosaic image request is sent from the portable terminal to the server, where at step 302 the system queries whether the mosaic will contain non-user defined content. If the answer to the query is yes, at step 303 the system will identify user and mosaic attributes for pre-defined content, such as third-party content (this could be advertising content, or the like); at step 304 the server retrieves third-party content form a library of content, with the associated values for the content based on user and mosaic attributed identified in step 303; at step 305 the system queries whether there is to be a pre-defined layout (i.e., not randomly generated based on the value match default algorithm). If the answer is yes, at step 306 the system creates predefined layout information for selected third-party sub-content. The system at step 307 retrieves the command list and user sub-content to be displayed in the mosaic, along with the corresponding values for the sub-content; the system then queries at step 308, whether the user-defined content has a pre-defined layout for the content. If the answer is yes, the system at 309 creates a pre-defined layout based on information for selected user sub-content; at steps 310 the server retrieves the cover image of the mosaic from the portable terminal; and at step 311 the cover image, the mosaic generation information, sub-content list which includes both pre-defined and user defined items with values and any pre-assigned layout information is collected and queued.

Figure 4:
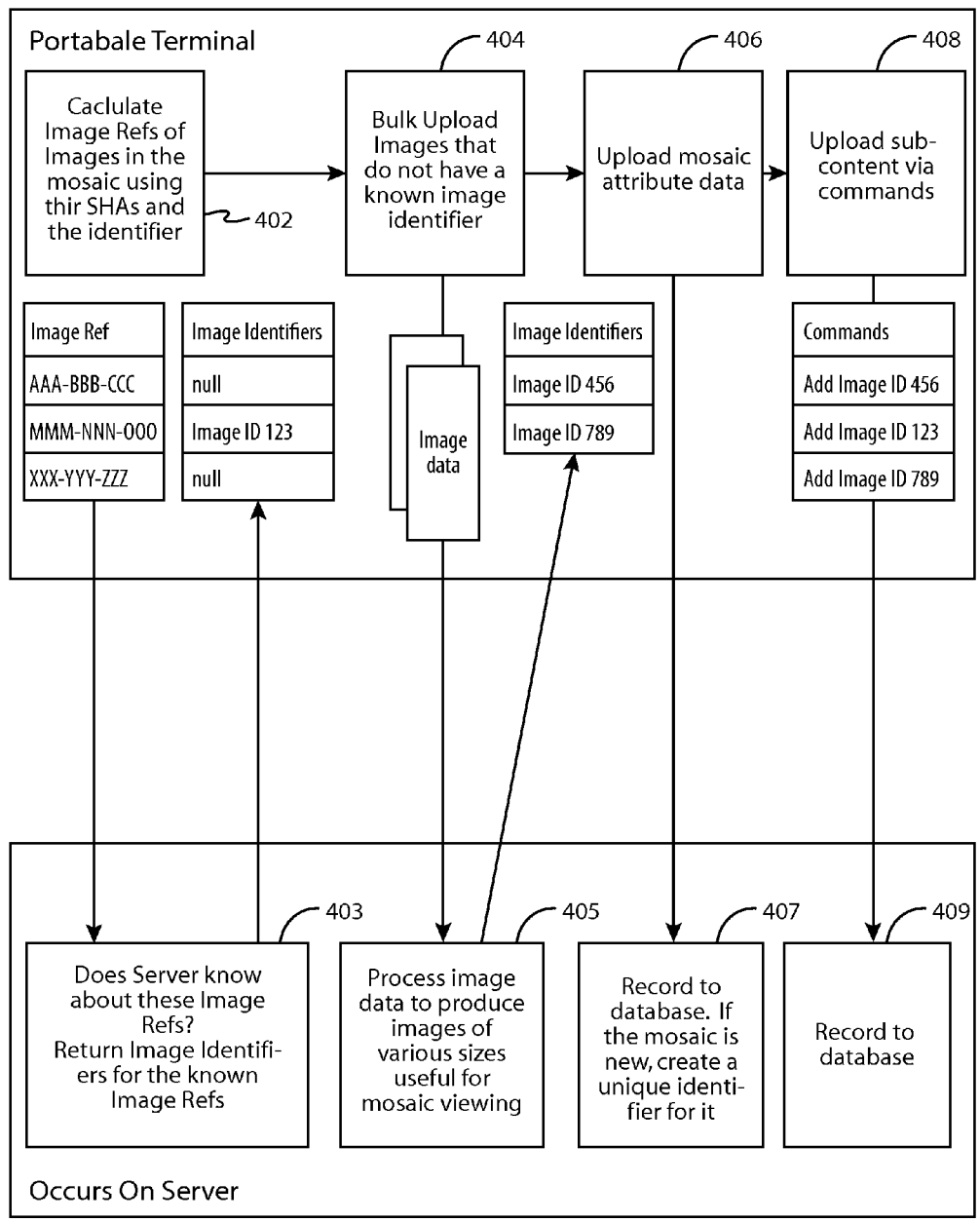
FIG. 4 shows an overview of the method of arranging and uploading an interactive mosaic on a portable terminal according to one embodiment of the present invention.

FIG. 4 shows a more detailed flowchart of uploading mosaic content on a portable terminal according to one embodiment of the invention. In one embodiment, the system is configured to calculate Image References 402 based on the SHA of the sub-content and the user's ID. These Image References are then transmitted to the server where in the server determines whether it has already received the particular sub-content from the user 403. For those sub-content it already has, the server sends the Image ID to the terminal. The terminal then selects the sub-content for which it has not received Image IDs and uploads 404 those in a transmission to the server. After the server processes the sub-content received, the server assigns Image Ds to each item and stores each item. Further processing 405 also occurs to the sub-content. The Image IDs are then sent to the terminal which uploaded the sub-content. The terminal then uploads the Mosaic Attribute Data 406. The server records any modifications to the data and, if the data represent a new mosaic, records a new mosaic and assigns a new Mosaic ID 407, which is subsequently transmitted back to the terminal transmitting the mosaic. Finally, the terminal issues a set of commands 408 to the server which define what sub-content actions have occurred in the mosaic image. The server then records 409 these commands which it then uses to transmit the current version of the mosaic image to terminals which are viewing the mosaic image.

Figure 5:
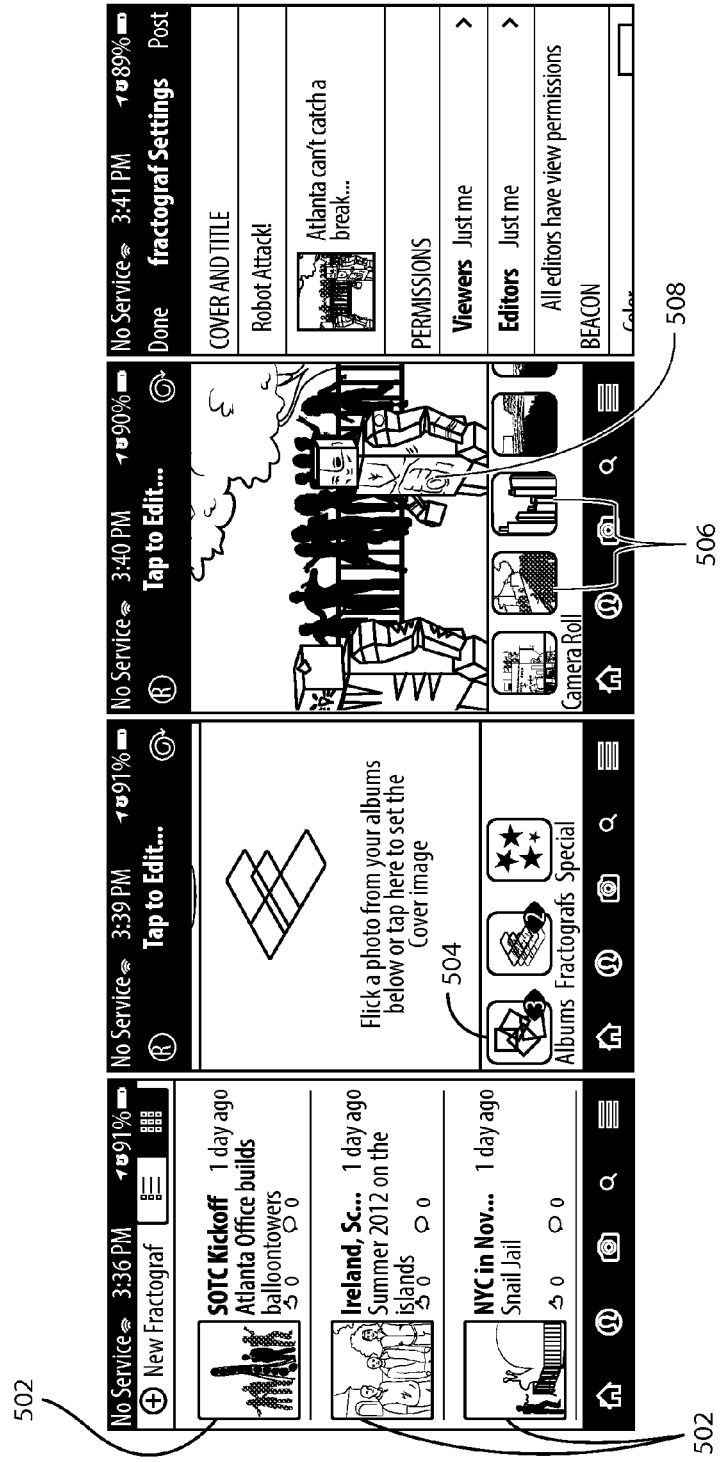
FIGS. 5 (a), (b), (c) and (d) show screenshots for the image processing method.

FIG. 5 shows a number of screen shots of the method and system of the present invention. FIG. 5(a) illustrates a number of mosaics 502 in a user feed on a social network. FIG. 5(b) shows the system prompting a user to begin the process of generating an interactive mosaic by selecting a cover image. The image is selected by flicking (i.e., by touch screen technology) a photo from an album 504 to select the cover image. FIG. 5(c) shows the mosaic during generation with the user flicking (adding) in content to build the mosaic. Content 506 is shown across the bottom of the larger cover image 508. FIG. 5(d) shows a screen shot where a user can add additional information such as titles and descriptions, tags and other details to the mosaic.

Each sub-content is compressed by the portable terminal by a first compression factor to generate a medium resolution sub-content and this is stored to the server and/or the portable terminal.

Each medium resolution sub-content is further compressed by one of the portable terminal or the server by a by a second compression factor and each low resolution sub-content is stored to the server and/or the portable terminal.

The mosaic of sub-content displayed on the portable terminal is a mosaic of low resolution sub-content. The user accesses the stored medium resolution sub-content by hovering a display focal point over the low resolution sub-content within the mosaic. This initiates transmission of the medium-resolution sub-content from the server to the portable terminal and the portable terminal displays the medium-resolution sub-content on the display in an enlarged view.

Figure 6:
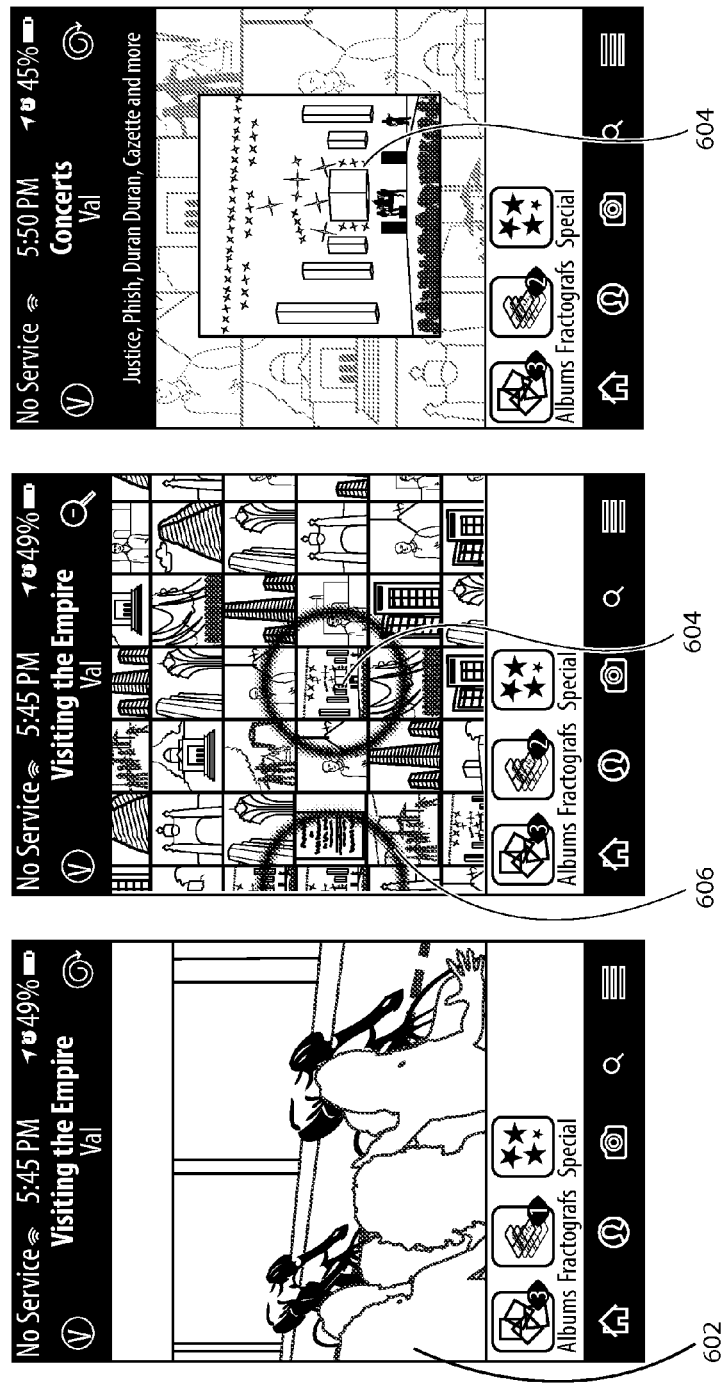
FIGS. 6 (a), (b) and (c) show screenshots of a cover image, a zoomed-in view of the cover image showing the sub-image, and an example of a grid block's sub-image, and shows a sub-image after a user has hovered a focal point over the sub-image, thereby sending a command from the portable terminal to transmit a higher resolution image from a server to a portable terminal to display the high resolution image.

FIG. 6 shows screenshots illustrating the medium-resolution image retrieval process. FIG. 6(a) shows an example mosaic 602. FIG. 6(b) shows an example of the display focal point selecting a particular sub-content 604, and an example of displaying a visual indictor of linked content. The light emitting from the sub-content 604, referred to as a beacon 606, identifies linked content. When the user selects that particular content with the visual indicator, a second, or third, or $n^{th}$ mosaic that is linked becomes visible. FIG. 6(c) shows the selected sub-content 604 as a medium resolution image. To improve the view of the enlarged sub-content, the intensity of the background mosaic relative to the selected sub-content is reduced. The additional information associated with the selected sub-content is also displayed in the display.

Additional information can include information such as the location, the author, the date, image-related identifying information, such as tagged information that has been associated with the image either by a user or by the system.

In some embodiments, the mosaic of sub-content includes collaborative editing information allowing the mosaic of sub-content to be downloaded from the server to another portable terminal for display on the portable terminal, the mosaic of sub-content being editable by adding and/or removing sub-content to the mosaic of sub-content.

The library of content is typically a user defined (user generated or user compiled) library, however, the library may alternatively be a third party defined library. In certain embodiments, the library may be a combination of user defined sub-content and third party content. The third part content may be related sub-content, such as advertising sub-content. The additional information of the advertising sub-content may include hyperlinks to e-commerce sites.

Figure 7:
FIG. 7 shows an example of pre-defined content, such as advertising content.

FIG. 7 shows an example of pre-defined sub-content, specifically, sub-content from a third party library. Typically this includes advertising sub-content that is embedded within the mosaic based on information about the mosaic or alternatively based on correlations between the additional information associated with each sub-content. The system is further configured so that third-party sub-content is linked to additional content, such as a website, a mosaic, or any other suitable content.

Sub content includes images, and also includes a single frame of a video, or an image representing something else such as an album cover or an image for a radio show i.e. the image is representative of content such as an audio file. If the image is a frame of a video, the frame is selected by a user from the video by pausing the video.

The medium resolution sub-content is typically an image file having 512 (ex: 512×512) pixels. The low resolution sub-content is typically an image file having 128 (ex: 128×128) pixels. Other values are possible.

The method further includes a modification method where the mosaic of sub-content is synchronized and reproduced on a plurality of portable terminals in real time. The first portable terminal transmits the mosaic generation information together with the sub-content to the server and the server transmits the mosaic generation information together with the sub-content to the second portable terminal so that the second portable terminal can use the mosaic generation information together with the sub-content to display the mosaic of sub-content.

If the first portable terminal changes, updates, edits, or amends the mosaic of sub-content, then the mosaic generation information together with the sub-content changes to incorporate the change, update, edit or amendment and a second mosaic generation information together with the sub-content is generated and transmitted to the server.

The server then transmits the second mosaic generation information together with the sub-content to the second portable terminal for display by the second portable terminal.

An automatic process may be applied so that the server is checked for updates on a regular basis or updates are automatically set to all portable terminals viewing the mosaic.

A further identifying step is utilized to identify whether sub-content is stored on the server, and if the sub-content is not stored on the server, the new sub-content is transmitted to the server and stored to the server. Any new sub-content is compressed by a first compression factor to produce a medium resolution sub-content and this is stored to the server. Similarly, the new sub-content is further compressed by a second compression factor and the low resolution image is stored to the server and/or the portable terminal.

The method further includes accessing a first mosaic of sub-content from the server and downloading the first mosaic of sub-content onto a first portable terminal for displaying on a display of the first portable terminal. The user then identifies a link between the first mosaic of sub-content and a second mosaic of sub-content stored on the server using predetermined identification criteria. The portable terminal then accesses the second mosaic of sub-content from the server and generating and transmitting a sub-content representing the second mosaic of sub-content onto a first portable terminal for displaying on a display of the first portable terminal.

In certain embodiments, a second mosaic of sub-content is embedded within the first mosaic of sub-content. For example, a second cover image forms a part of the first mosaic, the second cover image representing the second mosaic of sub-content so that the first mosaic of sub-content and the second mosaic of sub-content are linked. In this manner, a user can navigate through the first mosaic of sub-content and access the second mosaic of sub-content. Hovering a display focal point and selecting, by pressing or touch, or by clicking on the second mosaic of sub-content accesses the second mosaic of sub-content.

Various modifications to the detailed designs as described above are possible. For example, the mosaic generation information may include descriptive information about the mosaic such as titles, descriptions, links to related mosaics and external sources such as web links.

The mosaic may be linked to social media sites and included in users' content feeds. Once a mosaic has been updated or edited or newly created, a notification is pushed to the user feed to inform the user of the update.

With the above-described methods, a user processes a large number of sub-content and the user can display a large number of sub-content on a small screen of a portable terminal.

Furthermore, the compression step enables to user to easily share mosaics without transmitting large amounts of data. For example, medium resolution sub-content are not automatically transmitted to the portable terminal and only when the user requests the medium resolution sub-content is it then transmitted to the terminal. Thus there is a considerable reduction in the amount of data required to transmit the mosaic to/from a portable terminal.

Figure 8:
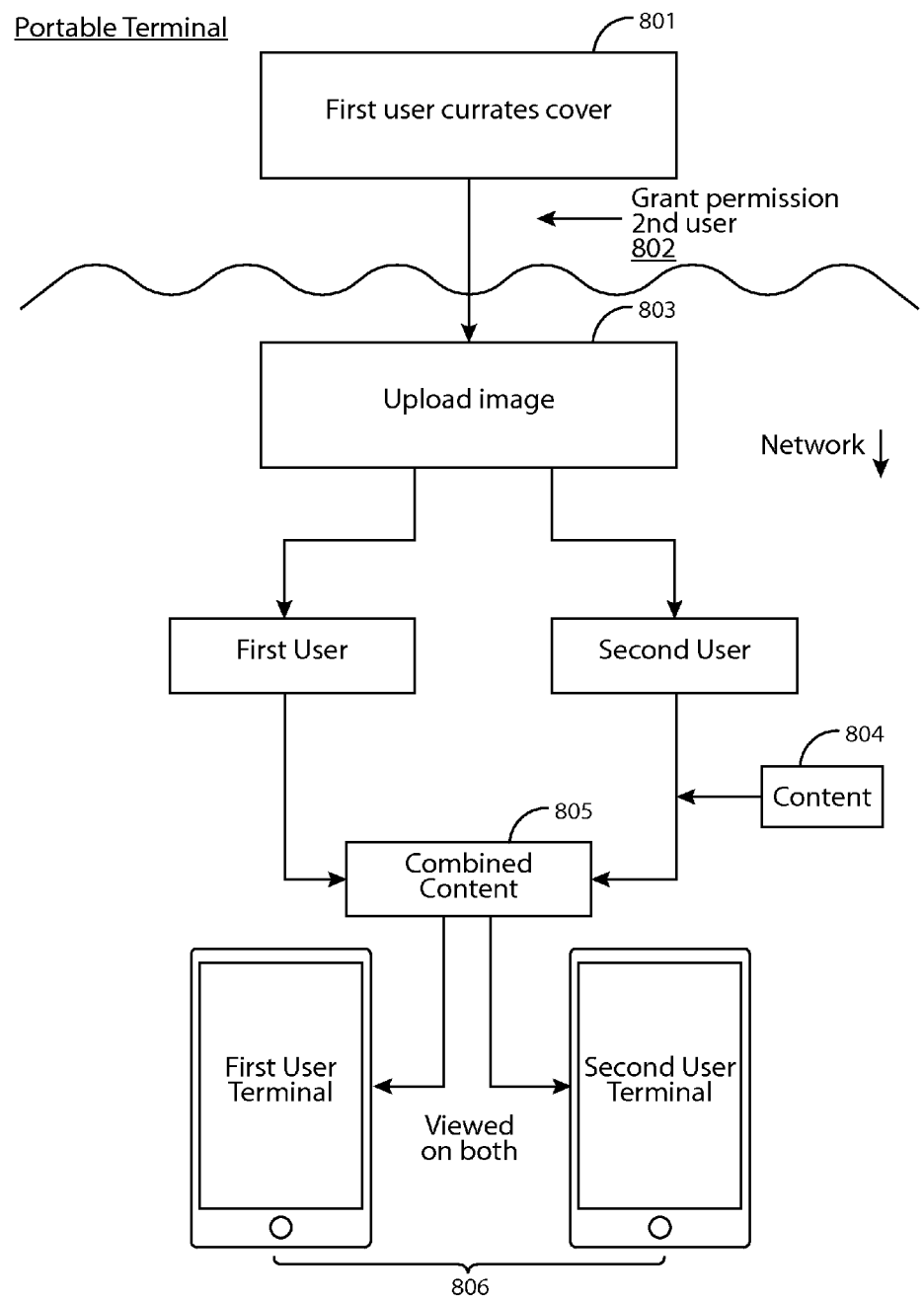
FIG. 8 shows a flowchart of a method for collaborating and sharing content amongst users.

FIG. 8 shows a flowchart of a collaborative platform and method for collaborating according to one embodiment of the present invention. The method for collaborating comprises the steps of; curating a cover image 801 on a portable terminal by a first user; granting permission for collaboration 802 to a second user; uploading by the first user a mosaic 803 that is viewable over a network by the second user on the portable terminal of the second user; uploading by the second user 804 content into the mosaic of the first user to create a combined content mosaic 805, whereby the combined content mosaic can be viewed from the portable terminal of the first user and the portable terminal of the second user 806.

Figure 9:
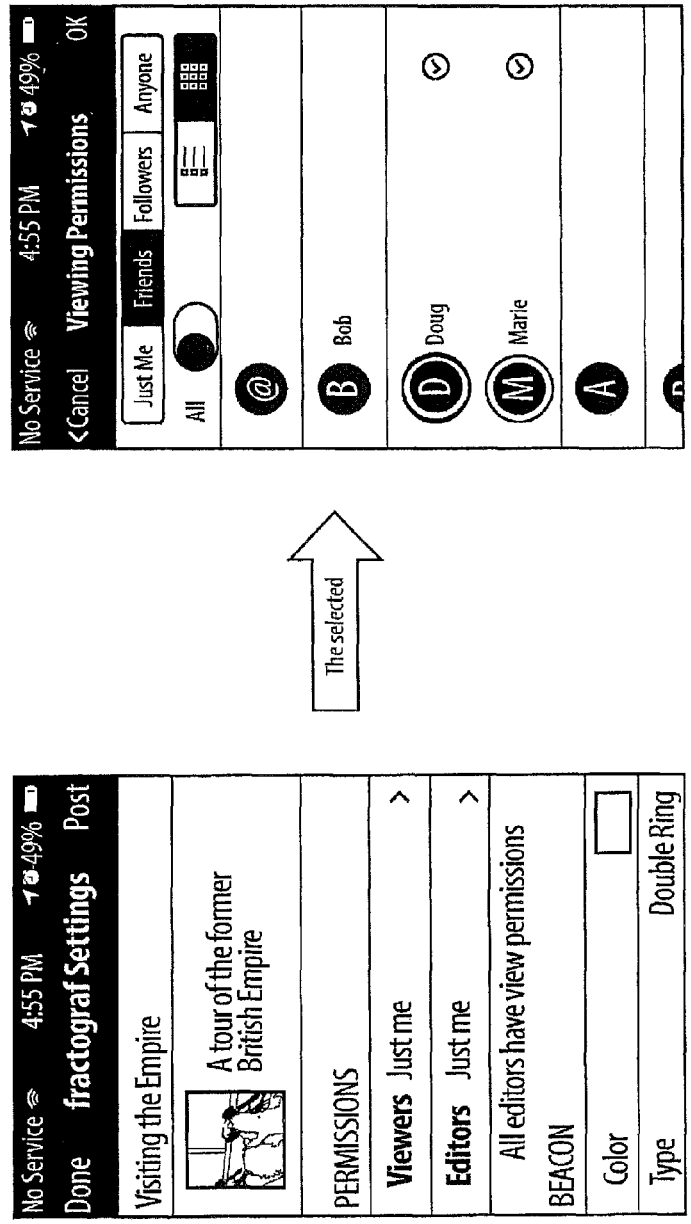
FIGS. 9A and 9B show various editing functions with which the system is configured.

FIG. 9 shows various editing function with which the system is configured. For each mosaic image produced, the user can set permissions about who can view the image and who can edit the image. Edit permission gives an allowed user the same rights to edit a mosaic image as the creator/user, with exceptions; such as restrictions on alterations to title, or other 'mosaic image settings'—see left image in figure.

FIGS. 10A and 10B show additional features of the collaborating and sharing platform according to one embodiment of the invention. FIG. 10A shows a grid layout of sub-content on a first user portable terminal and a second user portable terminal, whereby the letters refer to content shared between the users; a visual indicator 1002 alerts user of location of sub-content in mosaic image that the user signals the terminal to locate. FIG. 10B shows a first user and a second user adding user-selected content to a shared-mosaic.

Figure 11A:
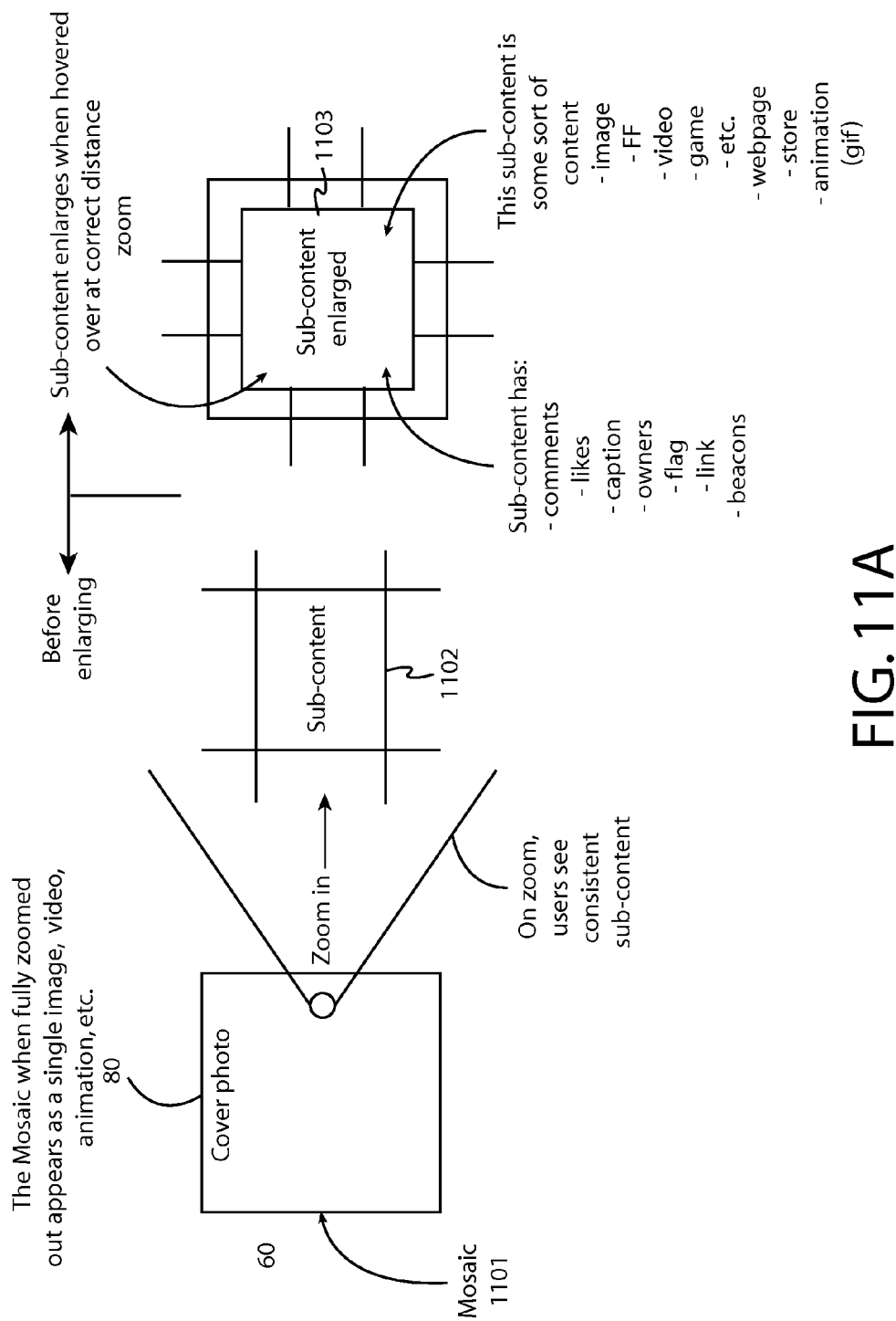
FIGS. 11A and 11B show an schematic of a mosaic when fully zoomed and sub-content when enlarged as well as linking of mosaics via sub-content amongst users.

FIG. 11A shows a schematic of the mosaic and sub-content arrangement. When the mosaic 1101 is fully zoomed out is appears as a single image, video or animation. When a portion of the mosaic 1101 is expanded, it reveals a collection of sub-content arranged as a grid 1102. Individual sub-content is expanded by hovering over a focal point of the sub-content. The remaining sub-content fall into the background and the sub-content can be enlarged.

Figure 11B:
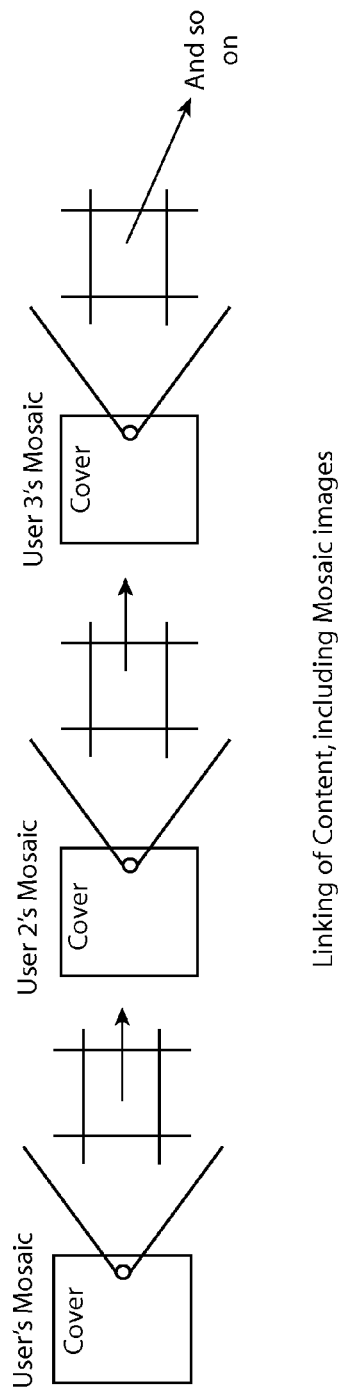

FIG. 11B shows how mosaic images may be embedded such that a first user's mosaic may contain a second user's mosaic which may itself contain a third user's mosaic.

Figure 12:
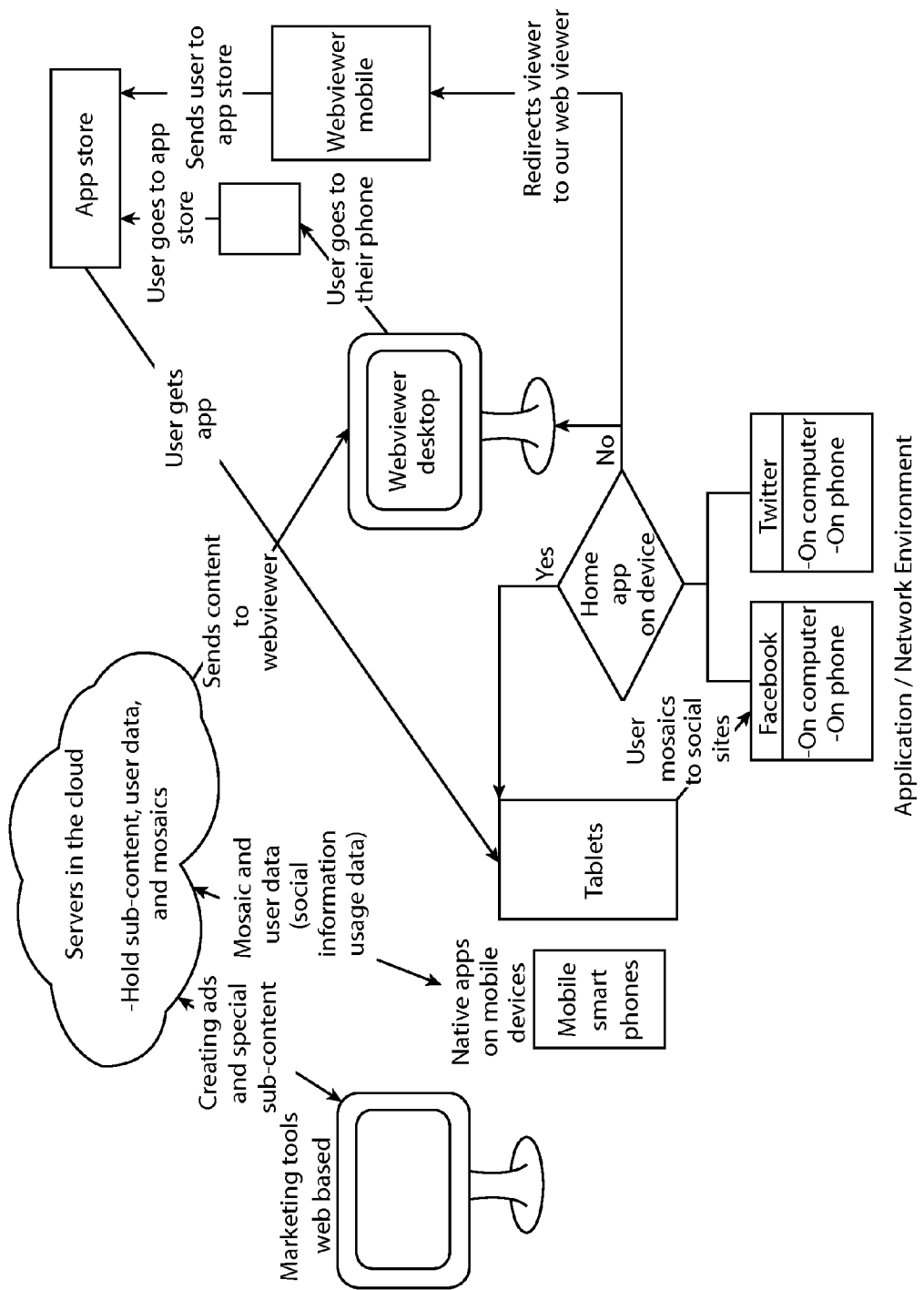
FIG. 12 shows an exemplary network environment in which the system and method operate.

FIG. 12 shows an exemplary network environment wherein the system and method described herein operates.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An image processing method for generating a mosaic of images, the method comprising the steps of:
   selecting a cover image from a plurality of images;
   dividing the cover image into a predetermined number of grid blocks;
   calculating a value of each of the grid blocks and storing the value and the corresponding grid block coordinate information that indicates the relative positions of the grid blocks relative to each other within the cover image;
   selecting, for each grid block, sub-content from a library of sub-content based on an accepted correspondence between the average value of the grid block and an average value of the sub-content, and assigning the sub-content to the grid block;
   verifying with a server to determine whether each sub-content exists on the server and transmitting sub-content not present on the server, to the server;
   transmitting mosaic generation information to the server, the mosaic generation information including a list of sub-content to be displayed in the mosaic, each sub-content including corresponding matching value;
   displaying on a display of a portable terminal the sub-content using the mosaic generation information so that the cover image is reproduced to form of a mosaic of sub-content that represents the cover image;
   wherein each sub-content includes additional information specific to each sub-content.

2. A method according to claim 1, further comprising:
   compressing each sub-content by a first compression factor and storing a medium resolution sub-content on the server and/or the portable terminal; and
   compressing each medium resolution sub-content by a second compression factor and storing the low resolution sub-content on the server and/or the portable terminal.

3. A method according to claim 2, wherein the mosaic of sub-content is a mosaic of low resolution sub-content.

4. A method according to claim 3, wherein the medium resolution sub-content is transmitted from the server to the portable terminal when a display focal point is hovered over the low resolution sub-content within the mosaic.

5. A method according to claim 1, further comprising predetermined sub-content wherein each sub-content is assigned to a predetermined number or set of grid blocks.

6. A method according to claim 1, wherein the additional information includes image access information and/or image recognition information.

7. A method according to claim 1, wherein the mosaic of sub-content includes collaborative editing information allowing the mosaic of sub-content to be downloaded from the server to another portable terminal for display on the portable terminal, the mosaic of sub-content being editable by adding and/or removing sub-content to the mosaic of sub-content.

8. A method according to claim 1, wherein the library is a user defined library, and optionally wherein the library is a third party defined library.

9. A method according to claim 1, wherein the sub-content is one or more selected from an image, another mosaic, or video file.

10. A method according to claim 9, wherein the image is a single frame of a video, the frame being selected by a user, wherein the frame is selected from the video by pausing the video, or the image is representative of content such as an audio file.

11. A method according to claim 1, further comprising the steps of:
    synchronizing and reproducing at least one mosaic of sub-content by a first portable terminal in real time with a second portable terminal by transmitting the mosaic of sub-content by a first portable terminal to the server, the server transmitting the mosaic of sub-content to the second portable terminal;
    receiving a change to the at least one mosaic of sub-content from the first portable terminal and transmitting the sub-content changes to the server; and
    transmitting by the server the change to the at least one mosaic of sub-content to the second portable terminal for display by the second portable terminal.

12. A method according to claim 11, further including identifying whether a sub-content is stored on the server, and if the sub-content is not stored on the server, transmitting the sub-content to the server and storing the sub-content on the server.

13. A method according to claim 11 or 12, further comprising:
    compressing each sub-content by a first compression factor and saving the medium resolution sub-content on the server and/or the portable terminal; and
    compressing each medium resolution sub-content by a second compression factor and saving the low resolution sub-content on the server and/or the portable terminal.

14. A method according to claim 1, further comprising the steps of:
    accessing a first mosaic of sub-content from the server and downloading the first mosaic of sub-content onto a first portable terminal for displaying on a display of the first portable terminal;
    identifying a link between the first mosaic of sub-content and a second mosaic of sub-content stored on the server using predetermined identification criteria, wherein the link is a visual indicator that is evident to a user and signals an entry point into another mosaic of sub-content when the link is selected by the user;
    accessing the second mosaic of sub-content from the server and generating and transmitting a sub-content representing the second mosaic of sub-content onto a first portable terminal for displaying on a display of the first portable terminal;
    embedding within the first mosaic of sub-content, a second cover image, the second cover image representing the second mosaic of sub-content so that the first mosaic of sub-content and a second mosaic of sub-content are linked.

15. A non-transitory computer-readable medium having recorded thereon a program that causes a portable device to execute a method for generating a mosaic of images, the method comprising:
    selecting a cover image from a plurality of images;
    dividing the cover image into a predetermined number of grid blocks;
    calculating an average color value of each of the grid blocks and storing the average color value and the corresponding grid block coordinate information that indicates the relative positions of the grid blocks relative to each other within the cover image;
    selecting, for each grid block, sub-content from a library of sub-content based on an accepted correspondence between the average color value of the grid block and an average color value of the sub-content, and assigning the sub-content to the grid block;
    verifying with a server to determine whether each sub-content exists on the server and transmitting sub-content not present on the server to the server;
    transmitting mosaic generation information to the server, the mosaic generation information including a list of sub-content to be displayed in the mosaic, each sub-content including corresponding grid block location information;
    displaying on a display of a portable terminal the sub-content using the mosaic generation information so that the cover image is reproduced to form of a mosaic of sub-content that represents the cover image;
    wherein each sub-content includes additional information specific to each sub-content.

* * * * *